(12) United States Patent
Kim et al.

(10) Patent No.: US 10,355,910 B1
(45) Date of Patent: Jul. 16, 2019

(54) SYSTEM AND METHOD FOR INTERACTIVE MANAGEMENT OF REMOTE DEVICE BASED ON LORA COMMUNICATION

(71) Applicant: Pusan National University Industry-University Cooperation Foundation, Busan (KR)

(72) Inventors: Jongdeok Kim, Busan (KR); Jaeyoung Jang, Busan (KR); Donghyun Kim, Busan (KR); Junhwan Huh, Busan (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 16/209,016

(22) Filed: Dec. 4, 2018

(30) Foreign Application Priority Data

Dec. 27, 2017 (KR) .................. 10-2017-0180677

(51) Int. Cl.
*H04L 12/24* (2006.01)
*H04W 52/02* (2009.01)
(Continued)

(52) U.S. Cl.
CPC ........ *H04L 41/0253* (2013.01); *H04L 67/125* (2013.01); *H04W 4/80* (2018.02);
(Continued)

(58) Field of Classification Search
CPC ... H04W 4/80; H04W 28/06; H04W 52/0267; H04W 52/0274; H04L 67/125; H04L 41/0253
See application file for complete search history.

(56) References Cited

U.S. PATENT DOCUMENTS

| 2014/0280737 A1* | 9/2014 | Bicket .................. H04L 67/02 709/218 |
| 2015/0236936 A1* | 8/2015 | Waldbusser ........ H04L 43/0817 370/252 |

(Continued)

FOREIGN PATENT DOCUMENTS

| KR | 10-2008-0054831 A1 | 6/2008 |
| KR | 10-2009-0086472 A1 | 8/2009 |

(Continued)

OTHER PUBLICATIONS

Korean Notice of Allowance for related KR Application No. 10-2017-0180677 dated Mar. 29, 2018 from Korean Patent Office.
(Continued)

*Primary Examiner* — Chi Ho A Lee
(74) *Attorney, Agent, or Firm* — Paratus Law Group, PLLC

(57) ABSTRACT

A system for interactive management of remote devices based on LoRa communication includes: a web application configured to provide a remote control page to a user; a cloud system server configured to transmit a management command and a transmission option to a gateway and to receive a summary packet for received data; the gateway configured to receive, from the cloud system server, input request data, transmit the request data to a terminal node, decode response data, and transmit the decoded response data to the cloud system server; and the terminal node configured to receive the management command and the transmission option and transmit the management command and the transmission option to a managed device and store corresponding response data from the managed device through local buffer control.

11 Claims, 16 Drawing Sheets

(51) Int. Cl.
*H04W 28/06* (2009.01)
*H04L 29/08* (2006.01)
*H04W 4/80* (2018.01)
*H04W 88/16* (2009.01)

(52) U.S. Cl.
CPC ....... *H04W 28/06* (2013.01); *H04W 52/0267* (2013.01); *H04W 52/0274* (2013.01); *H04W 88/16* (2013.01)

(56) References Cited

U.S. PATENT DOCUMENTS

| | | | | |
|---|---|---|---|---|
| 2016/0143004 | A1* | 5/2016 | Stromberg | H04W 76/10 370/329 |
| 2016/0182286 | A1* | 6/2016 | Lunden | H04W 24/02 370/254 |
| 2016/0188216 | A1* | 6/2016 | Bi | G06F 3/0605 710/313 |
| 2017/0118102 | A1* | 4/2017 | Majumder | G06F 9/45558 |
| 2018/0069221 | A1* | 3/2018 | Takahashi | H01M 2/38 |
| 2018/0183904 | A1* | 6/2018 | Zhao | H04L 67/125 |
| 2018/0288013 | A1* | 10/2018 | Hennebert | H04W 12/02 |
| 2019/0069221 | A1* | 2/2019 | Virgile | H04W 48/14 |
| 2019/0082498 | A1* | 3/2019 | Lai | H04W 4/70 |

FOREIGN PATENT DOCUMENTS

| | | |
|---|---|---|
| KR | 10-1477647 B1 | 12/2014 |
| KR | 10-1742443 B1 | 5/2017 |

OTHER PUBLICATIONS

Jaeyoung Jang et al. "Design and Implementation of Monitoring System for Analysis of Performance of LoRa", The workshop presentation file of Korean Institute of Information Scientists and Engineers, Dec. 2016, pp. 318-320.

Ye-Won Lee et al. "Streetlight Management System Using LoRaWAN", The journal of Korean Institute of Communications and Information Sciences, Mar. 2017, pp. 677-685, Vo. 42, No. 03.

Leonardo Bidese De Pinho et al., "Glove: A Distributed Environment for Scalable VOD Systems", The International Journal of High Performance Computing Applications, 2003.

\* cited by examiner

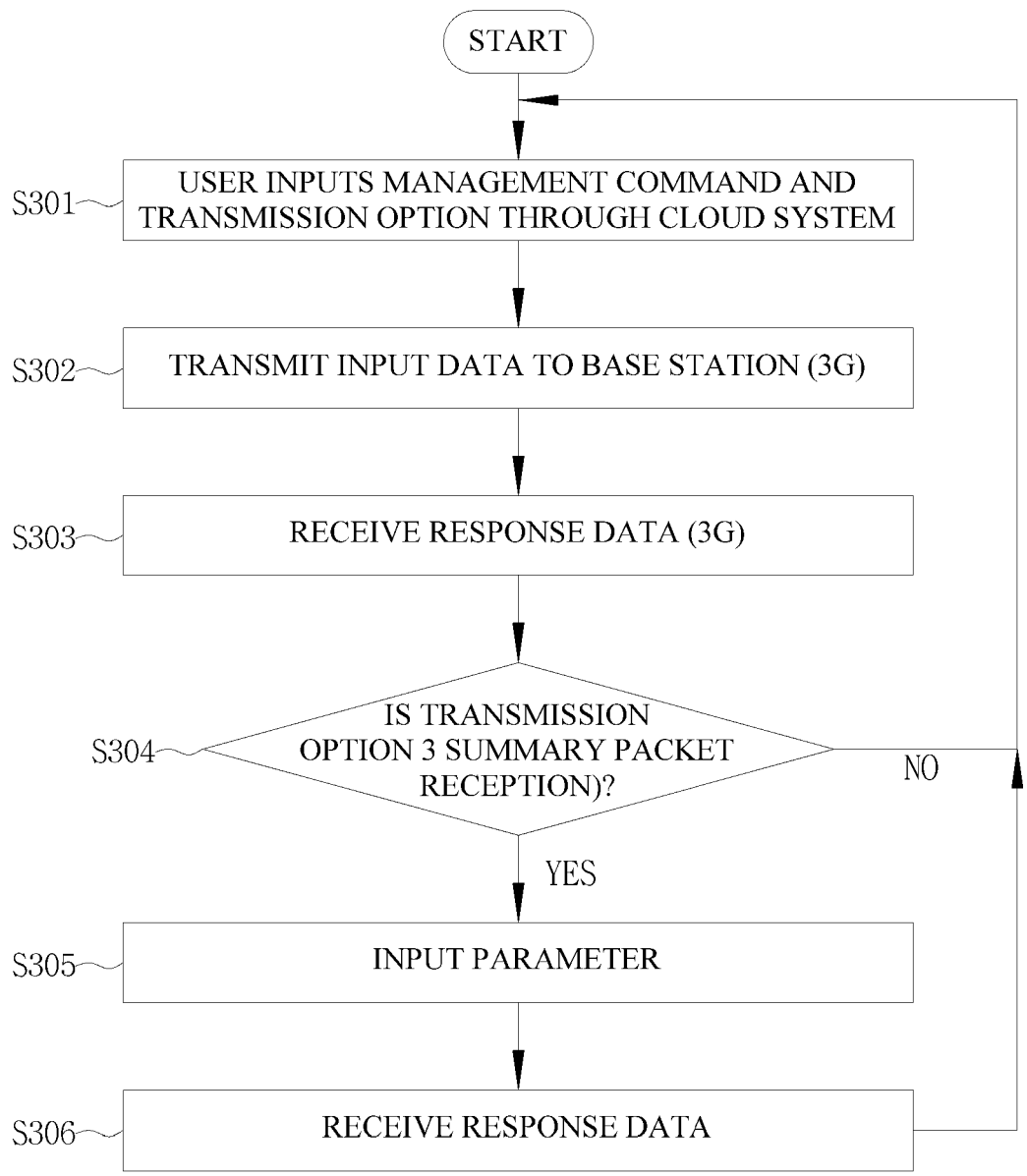

SYSTEM AND METHOD FOR INTERACTIVE MANAGEMENT OF REMOTE DEVICE BASED ON LORA COMMUNICATION

CROSS-REFERENCE TO RELATED APPLICATION

This application claims priority to and the benefit of Korean Patent Application No. 10-2017-0180677, filed on Dec. 27, 2017, the disclosure of which is incorporated herein by reference in its entirety.

BACKGROUND

The present invention relates to management of a remote device, and more particularly, to a system and method for interactive management of remote devices based on Long-Range (LoRa) communication that may remotely manage devices by constructing a low-power long-range communication system for management of remote devices by addressing the issue of a transmission speed difference between a remote device management interface and LoRa communication.

Long-Range Sub-Ghz Module (LoRa) communication is intended for Internet of Things (IoT) services requiring low power, low cost, and high reliability. LoRa communication network technology has a much wider range (a maximum of 21 km in an environment where a line of sight is secured) than other wireless protocols, and thus requires fewer repeaters and access points (APs). Accordingly, it may reduce the cost for building an infrastructure and provide higher extensibility and cost efficiency for embedded applications than 3G/4G cellular networks.

LoRa uses a Chirp spread spectrum modulation scheme, which is operated at low power, to increase the communication range. Chirp spread spectrum, which has been used in military and space communications for decades because of its wide coverage and robustness to interference, has been introduced into LoRa for commercial use for the first time.

The communication range of LoRa is from 2 km to 15 km in an urban area and reaches 30 km in an area where the line of sight is secured. The communication range of LoRa is from 1 km to 2 km in an underground area and is from 2 km to 3 km in an indoor space. LoRa is designed with a spread spectrum scheme to have a bandwidth of 125 kHz and a maximum transmission power of 14 dBm, to operate in an industrial, scientific, and medical radio band (ISM band), and to have a low transfer rate and maximum reception sensitivity of −138 dBm.

However, with expansion of IoT services, the number of field devices is increasing, and problems occurring in a system require a system operator to visit the site to control the problems, which may cause difficulties in performing failure recovery and require a longer recovery time.

Conventional systems often do not have a remote management function. Further, the conventional systems make it difficult to perform remote management when there is a problem with a network or devices suffer a problem.

In particular, since access from the outside is restricted due to reasons such as network security, it is difficult to cope with a problem occurring in the network or in the devices.

Therefore, there is a need for a new technology for effectively coping with problems occurring in a network and devices from a remote place.

PRIOR ART LITERATURE

Patent Documents

Korean Patent Publication No. 10-1742443
Korea Patent Application Publication No. 10-2009-0086472
Korean Patent Application Publication No. 10-2008-0054831

SUMMARY

The present invention is directed to a system and method for interactive management of remote devices based on Long-Range Sub-Ghz Module (LoRa) communication that may remotely manage devices by constructing a low-power long-range communication system for management of remote devices by addressing a transmission speed difference between a remote device management interface and LoRa communication.

The present invention is also directed to a system and method for interactive management of remote devices based on LoRa communication that may remotely manage devices by constructing a management network independent of an existing network and effectively cope with a failure occurring in managed devices by configuring a terminal node attachable to the managed devices.

The present invention is also directed to a system and method for interactive management of remote devices based on LoRa communication that may address the issue of memory shortage caused by a lightweight device through local buffer control for enhancing transmission efficiency in a remote device management terminal and preventing a loss resulting from a transmission speed difference.

The present invention is also directed to a system and method for interactive management of remote devices based on LoRa communication that may shorten a transmission time required for transmission of a large amount of data by compressing transfer data to be transferred from a remote device management terminal to a server and performing an interactive process.

The present invention is also directed to a system and method for interactive management of remote devices based on LoRa communication for interactive remote device management based on a LoRa communication that may efficiently cope with a raised issue by receiving and checking only data required by a user by performing an interactive process.

The objects of the present invention are not limited to the above-mentioned objects, and other objects not mentioned can be clearly understood by those skilled in the art from the following description.

According to an aspect of the present invention, there is provided a system for interactive management of remote devices based on Long-Range Sub-Ghz Module (LoRa) communication, the system including: a web application configured to provide a remote control page to a user; a cloud system server configured to transmit a management command and a transmission option to a gateway when the management command and the transmission option are input thereto through the web application and to receive a summary packet for received data; the gateway configured to receive, from the cloud system server, request data input by the user, transmit the request data to a terminal node through LoRa communication, decode response data received from the terminal node, and transmit the decoded response data to the cloud system server; and the terminal node configured to receive the management command and the transmission option from the gateway through the LoRa communication and transmit the management command and the transmission option to a managed device, and to store corresponding response data from the managed device through local buffer control.

Herein, the response data stored in the terminal node may be classified, compressed and transmitted according to the transmission option.

The terminal node may be operated based on a battery, be attached to the managed device to perform real-time interactive control, have an on/off switch function for the managed device, and construct a management network independent of a service network.

The terminal node may include a local buffer controller configured to perform local buffer control for controlling a combination of a system buffer, a coupling buffer, and a file according to an amount of information to be transmitted to prevent a loss resulting from a transmission speed difference.

The transmission option may be one of entire packet transmission, specific packet transmission, packet range designation transmission, and summary packet transmission.

According to another aspect of the present invention, there is provided a method of interactive management of remote devices based on LoRa communication, the method including: performing a user operation of inputting a management command and a transmission option through a web application; performing a cloud system server operation of transmitting the management command and the transmission option to a gateway when the management command and the transmission option are input and receiving a summary packet for received data; performing a gateway operation of receiving, from the cloud system server, request data input by the user, transmitting the request data to a terminal node through LoRa communication, decoding response data received from the terminal node, and transmitting the decoded response data to the cloud system server; and performing a terminal node operation of receiving the management command and the transmission option from the gateway through the LoRa communication and transmitting the management command and the transmission option to a managed device, and storing corresponding response data from the managed device through local buffer control.

Herein, the performing of the user operation may include: transmitting the management command and the transmission option to the gateway when the user inputs the management command and the transmission option through the cloud system server; transmitting the received command from the gateway to the terminal node through the LoRa communication, receiving the response data for the command and transmitting the received response data to the cloud system server; when the transmission option is an option to receive the summary packet, requesting, by the user, desired data by inputting a parameter to receive the a summary packet for the received data.

The performing of the gateway operation may include: receiving, by the gateway, the management command and the transmission option input by the user through the cloud system server; transmitting the received management command and the received transmission option from the gateway to the terminal node through the LoRa communication; receiving the response data from the terminal node and decoding the received response data; and transmitting the decoded data to the cloud system server.

The performing of the terminal node operation may include: receiving, by the terminal node, the management command and the transmission option from the gateway through the LoRa communication; transmitting the received data to the managed device through serial communication and storing corresponding response data through local buffer control; and compressing and transmitting the stored response data by classifying the stored response data according to the transmission option.

The compressing and transmitting may include: when the transmission option is entire packet transmission (1), compressing an entirety of the response data and transmitting the response data to the gateway; when the transmission option is specific packet transmission (2), compressing specific packet data requested by the user and transmitting the response data to the gateway; when the transmission option is packet range designation transmission (3), compressing specific packet range data requested by the user and transmitting the response data to the gateway; and when the transmission option is summary packet transmission (4), compressing first packet data, last packet data, and summary packet data, transmitting the compressed first packet data, last packet data, and summary packet data to the gateway, receiving additional request data from the gateway, and transmitting response data for the additional request data to the gateway.

The terminal node may periodically check whether the managed device is normal, wherein, when the terminal node issues a notification upon occurrence of a failure in the managed device, the user may remotely transmit a power control command so as to physically control (turn on/off) power of the managed device.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 3 to 6 are flowcharts illustrating a method of interactive management of remote devices based on LoRa communication according to the present invention;

DETAILED DESCRIPTION

Hereinafter, exemplary embodiments of a system and method for interactive management of remote devices based on Long-Range Sub-Ghz Module (LoRa) communication according to the present invention will be described in detail.

The features and advantages of the system and method for interactive management of remote devices based on LoRa communication according to the present invention will be apparent from the following detailed description of the embodiments.

Figure 1A:
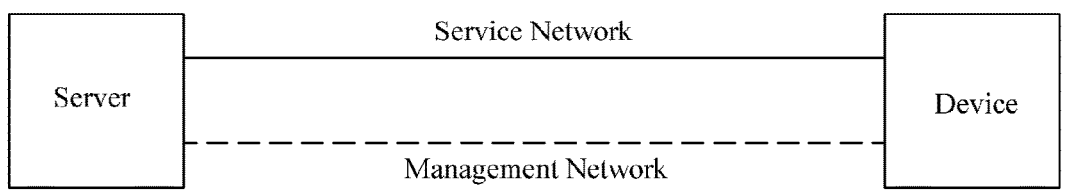
FIGS. 1A to 1C are diagrams of a network of a system for interactive management of remote devices based on Long-Range Sub-Ghz Module (LoRa) communication according to the present invention.
Figure 1B:
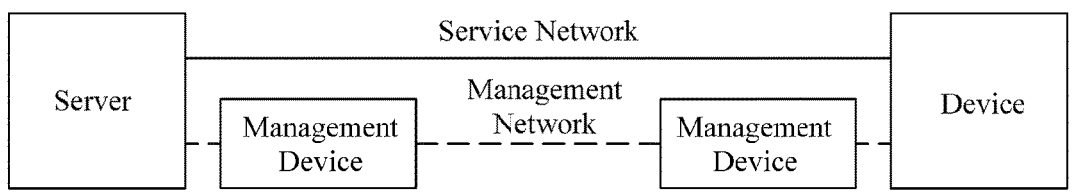
Figure 1C:
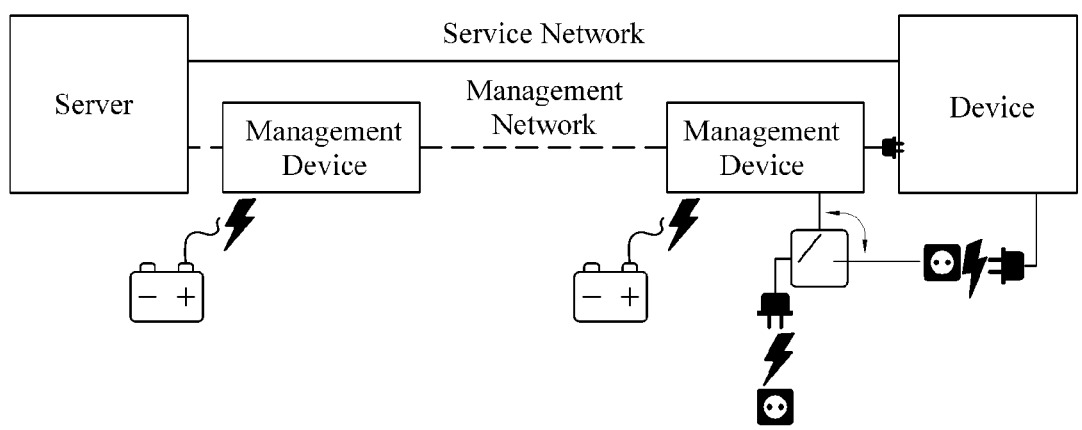
Figure 2A:
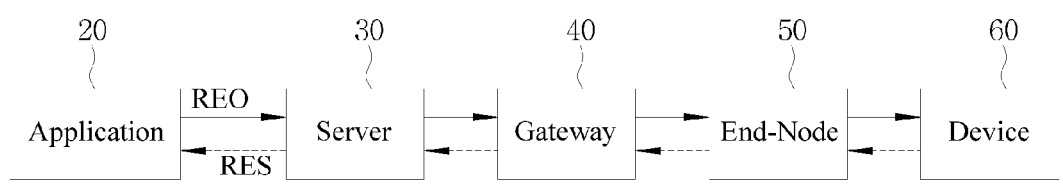
FIGS. 2A and 2B are diagrams of a configuration of the system for interactive management of remote devices based on LoRa communication according to the present invention.
Figure 2B:
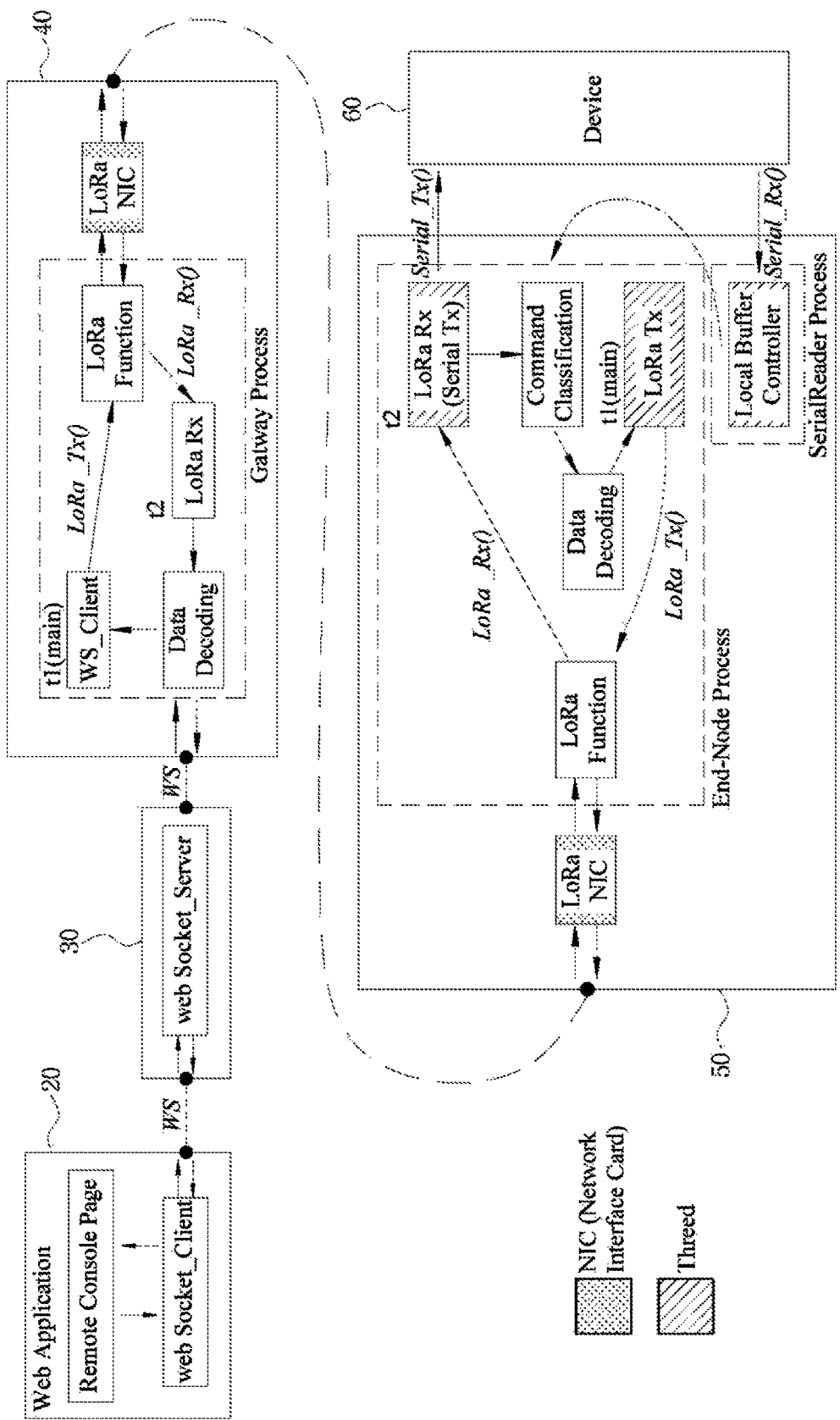

FIGS. 1A to 1C are diagrams of a network of a system for interactive management of remote devices based on LoRa communication according to the present invention, and FIGS. 2A and 2B are diagrams of a configuration of the system for interactive management of remote devices based on LoRa communication according to the present invention.

As shown in FIG. 1A, the system for interactive management of remote devices based on LoRa communication according to the present invention constructs a management network independent of existing service networks.

As shown in FIG. 1B, the management network is constructed through management devices which are easily attachable to managed devices.

As shown in FIG. 1C, the stand-alone remote device management system according to the present invention performs real-time interactive control using a local (serial) based device, operates based on a battery, and has an on/off switch function.

As shown in FIGS. 2A and 2B, the interactive remote device management system based on LoRa communication according to the present invention includes a web application 20 configured to provide a remote control page to a user, a cloud system server 30 configured to transmit a management command and a transmission option to a base station (gateway) upon reception of the management command and the transmission option through the web application 20 and to receive a summary packet for received data, a gateway 40 configured to receive, from the cloud system server 30, request data input by the user, to transmit the request data to a terminal node 50 through LoRa communication, and to decode response data received from the terminal node 50 to transmit the response data to the cloud system server 30, and the terminal node 50 configured to receive a management command and a transmission option from the gateway 40 through LoRa communication, to transmit received data to a managed device 60 through serial communication, to store corresponding response data from the managed device 60 through local buffer control, and to classify the stored response data according to the transmission option to compress and transmit the stored response data.

The interactive remote device management system based on LoRa communication according to the present invention configured as above has an interactive structure for addressing a transmission speed difference between the remote device management interface and the LoRa communication. When the user inputs a management command and a transmission option through the cloud system server 30, the interactive remote device management system transmits the management command and the transmission option to the terminal node 50 via the gateway 40. The terminal node 50 receives the management command and the transmission option from the gateway 40 through LoRa communication, transmits received data to the managed device 60 through serial communication, and stores corresponding response data from the managed device 60 through local buffer control. The stored response data is classified according to the transmission option so as to be compressed and transmitted.

A method of interactive management of remote devices based on LoRa communication according to the present invention will be described in detail.

FIGS. 3 to 6 are flowcharts illustrating a method of interactive management of remote devices based on LoRa communication according to the present invention.

FIG. 3 illustrates the method of interactive management of remote devices based on LoRa communication from a user perspective.

The user inputs a management command and a transmission option through a cloud system server (S301) and transmits the management command and transmission option to a gateway (S302).

Then, the gateway transmits the received command to a terminal node through LoRa communication and receives response data for the command (S303) and transmits the response data to the cloud system server.

When the transmission option is an option to receive a summary packet (S304), the user requests desired data by inputting a parameter (S305) to receive the summary packet for the received data (S306).

Figure 4:
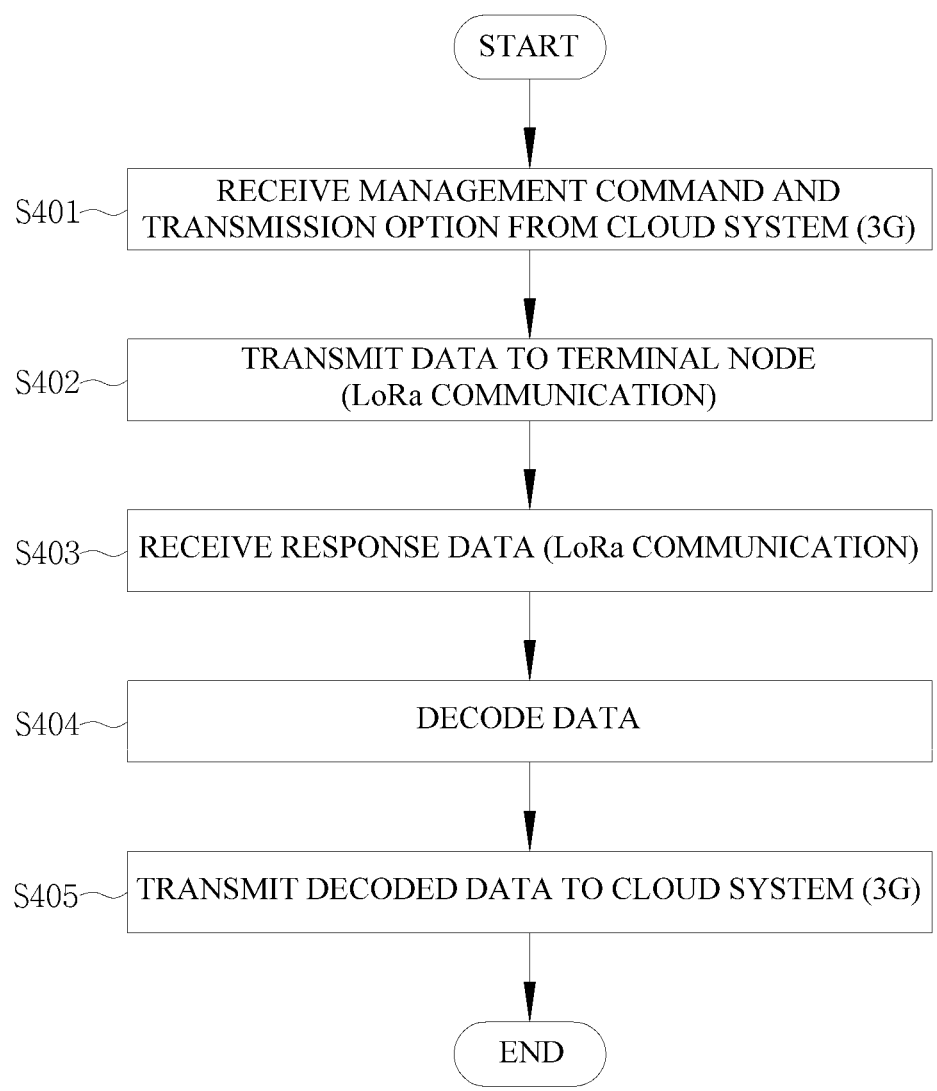

FIG. 4 illustrates the interactive remote device management method based on LoRa communication from a base station (gateway) perspective.

The gateway receives request data (a management command and a transmission option) input by the user from the cloud system server (S401).

The gateway transmits the request data (the management command and transmission option) to a terminal node through LoRa communication (S402).

Then, the gateway receives response data from the terminal node (S403) and decodes the received response data (S404).

Subsequently, the gateway transmits the decoded data to the cloud system server (S405).

Figure 5A:
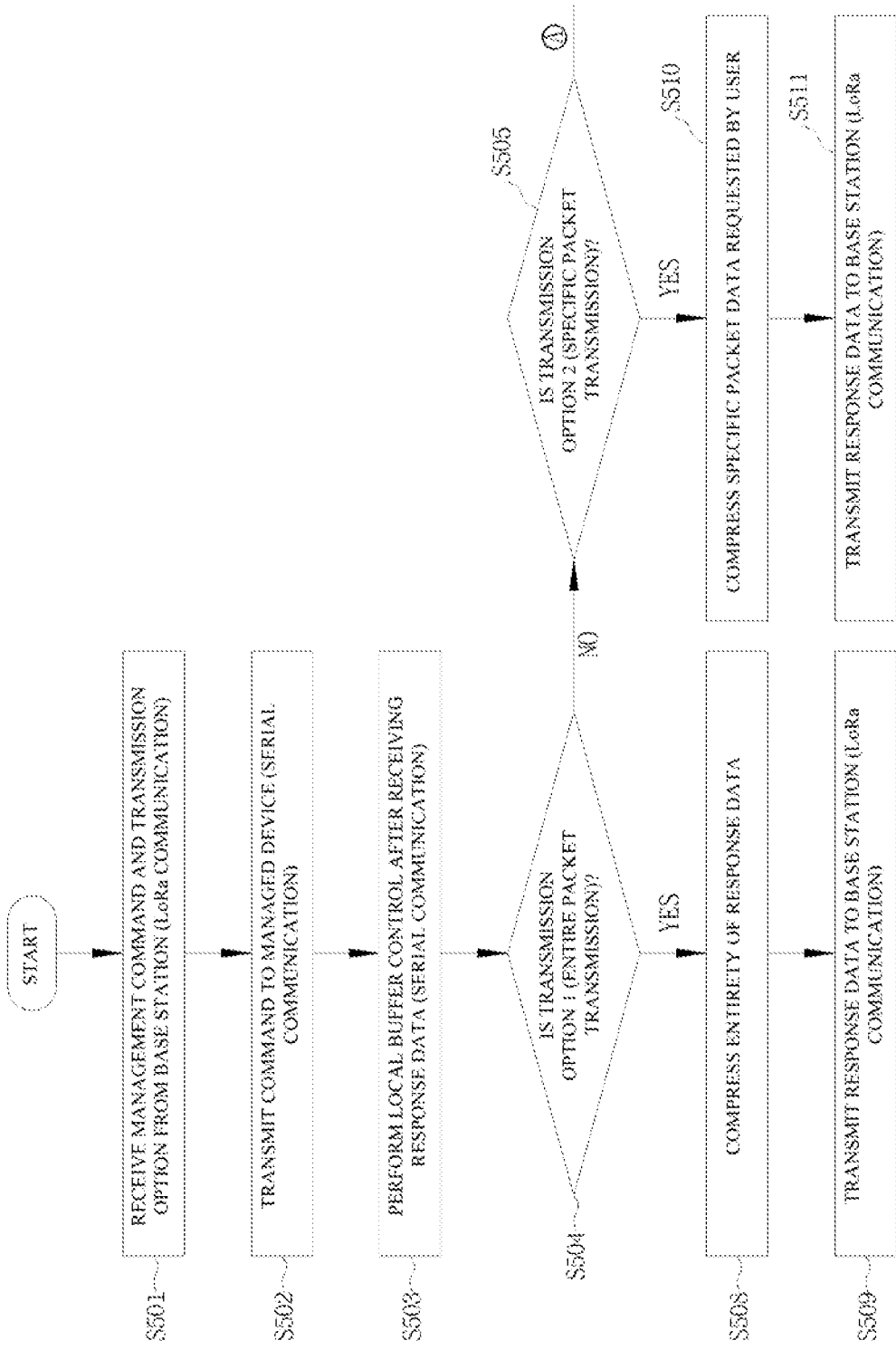
Figure 5B:
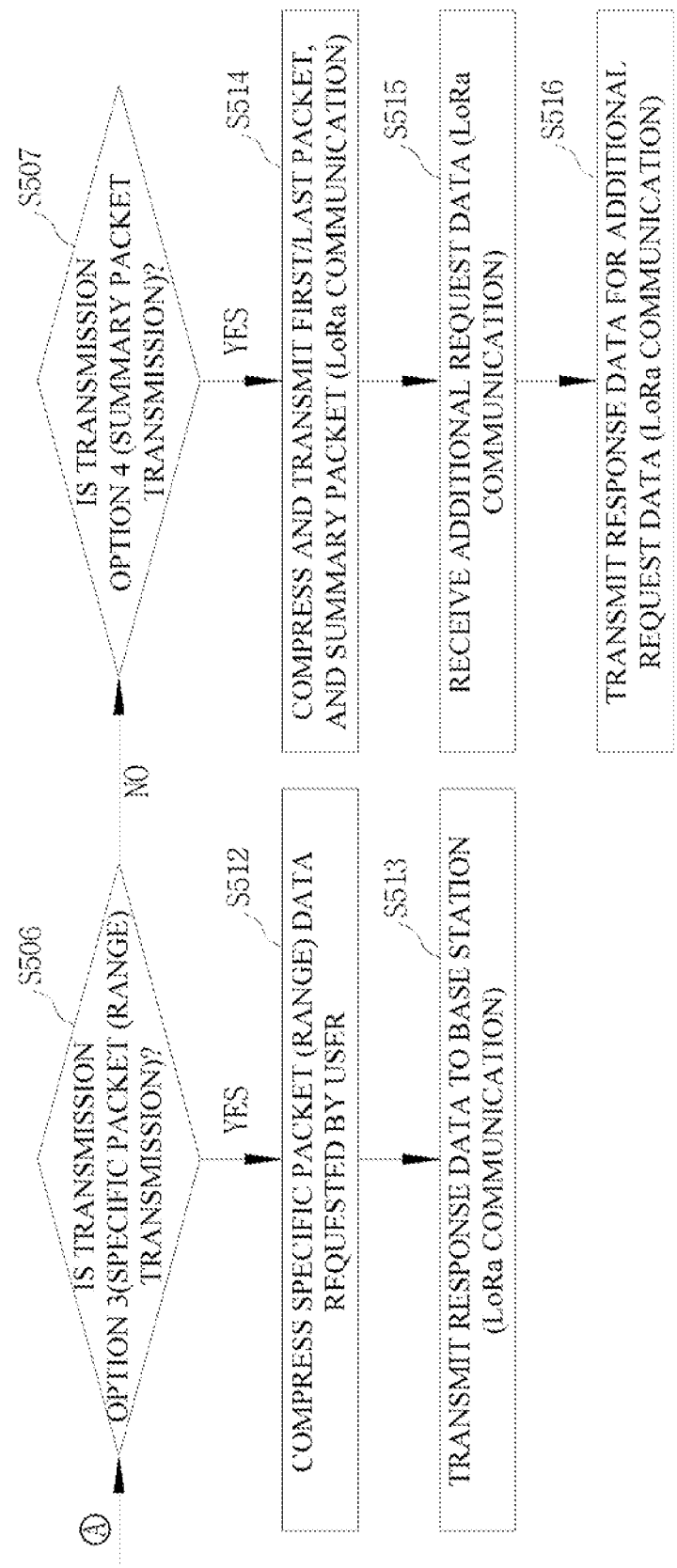

FIG. 5A, FIG. 5B illustrates the interactive remote device management method based on LoRa communication from a terminal node perspective.

Initially, the terminal node receives a management command and a transmission option from a base station through LoRa communication (S501).

The terminal node transmits the received data to a managed device through serial communication (S502) and stores corresponding response data through local buffer control (S503).

The terminal node classifies the stored response data according to the transmission option and compresses and transmits response data.

When the transmission option is entire packet transmission 1 (S504), the terminal node compresses the entirety of response data (S508) and transmits the response data to the gateway (S509).

When the transmission option is specific packet transmission 2 (S505), the terminal node compresses specific packet data requested by the user (S510) and transmits response data to the gateway (S511).

When the transmission option is packet range designation transmission 3 (S506), the terminal node compresses specific packet (range) data requested by the user (S512) and transmits response data to the gateway (S513).

When the transmission option is summary packet transmission 4 (S507), the terminal node compresses the first packet data, the last packet data, and summary packet data and transmits the compressed first packet data, the last packet data, and summary packet data to the gateway (S514). The terminal node receives additional request data from the gateway (S515) and transmits response data for the additional request data to the gateway (S516).

Figure 6:
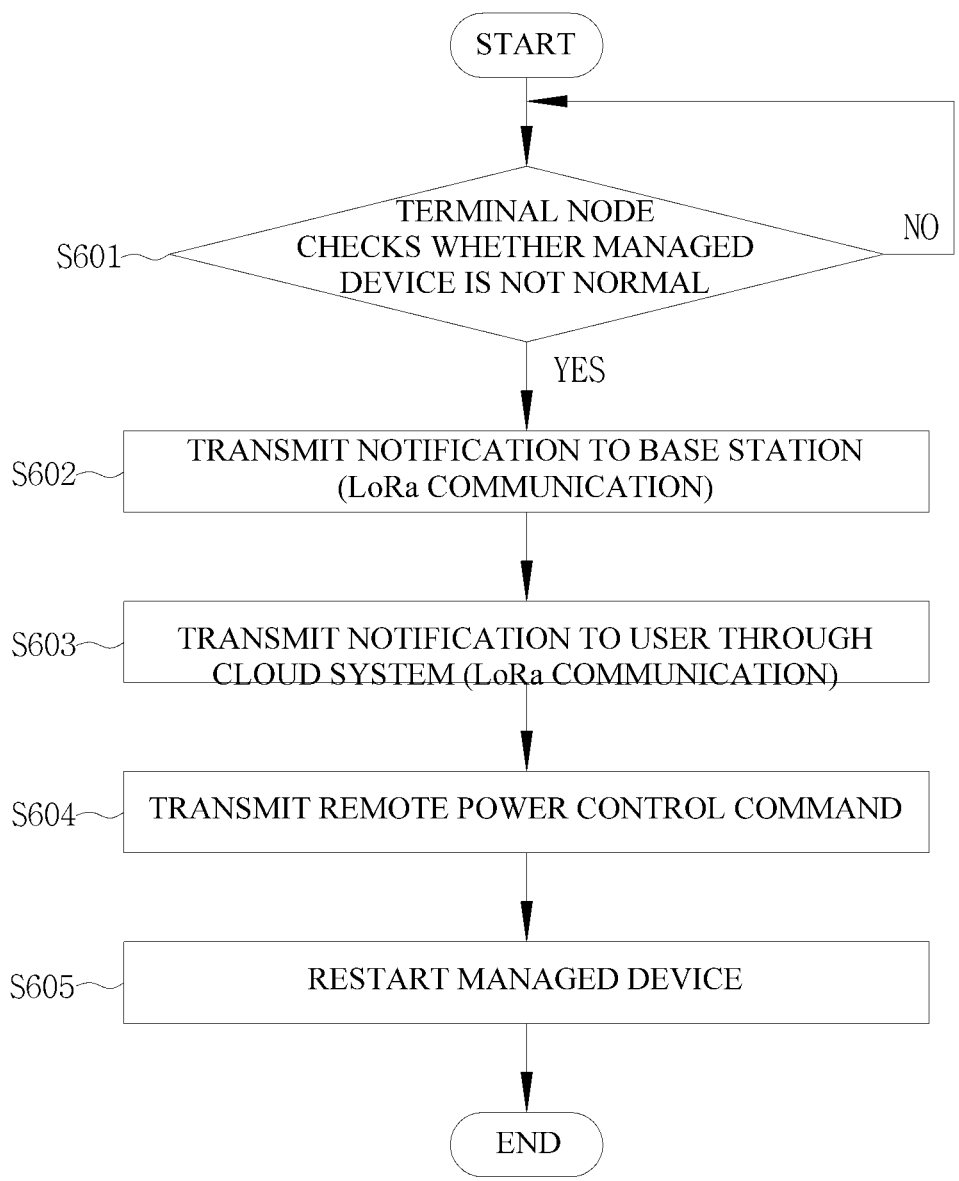
Figure 7:
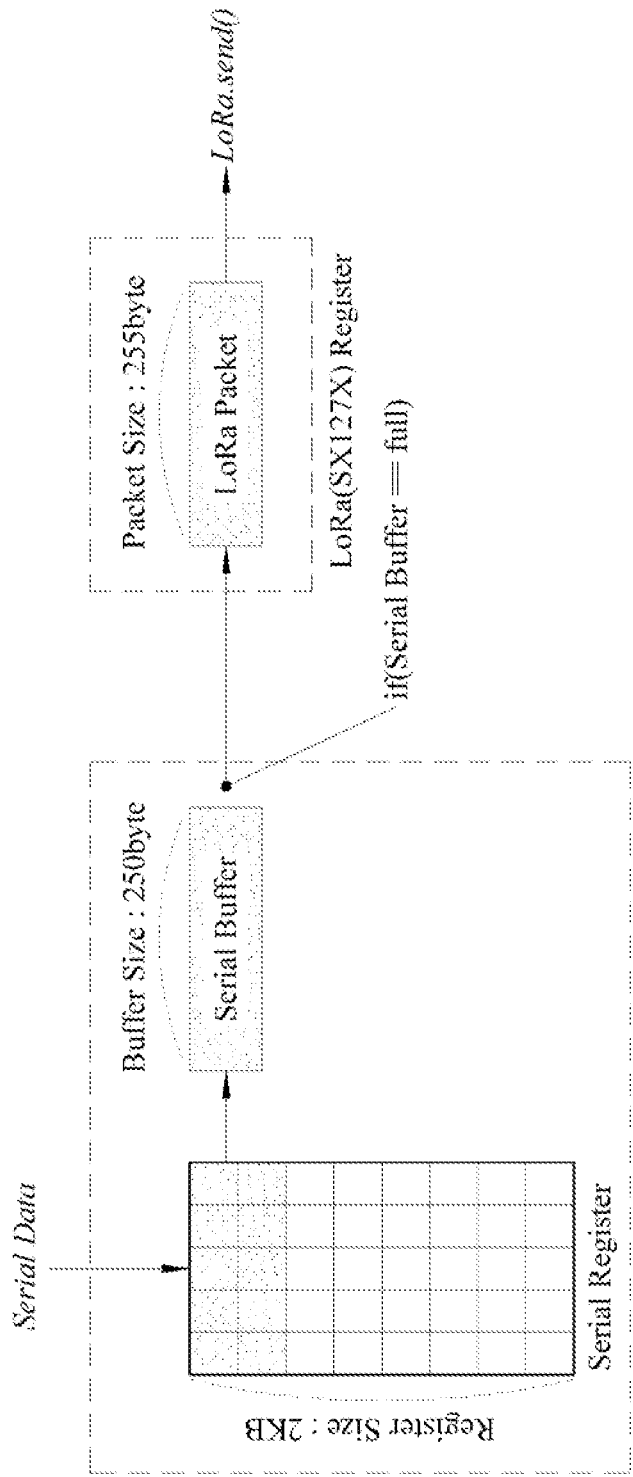
FIGS. 7 to 10 are diagrams illustrating a local buffer control procedure according to the present invention.
Figure 8:
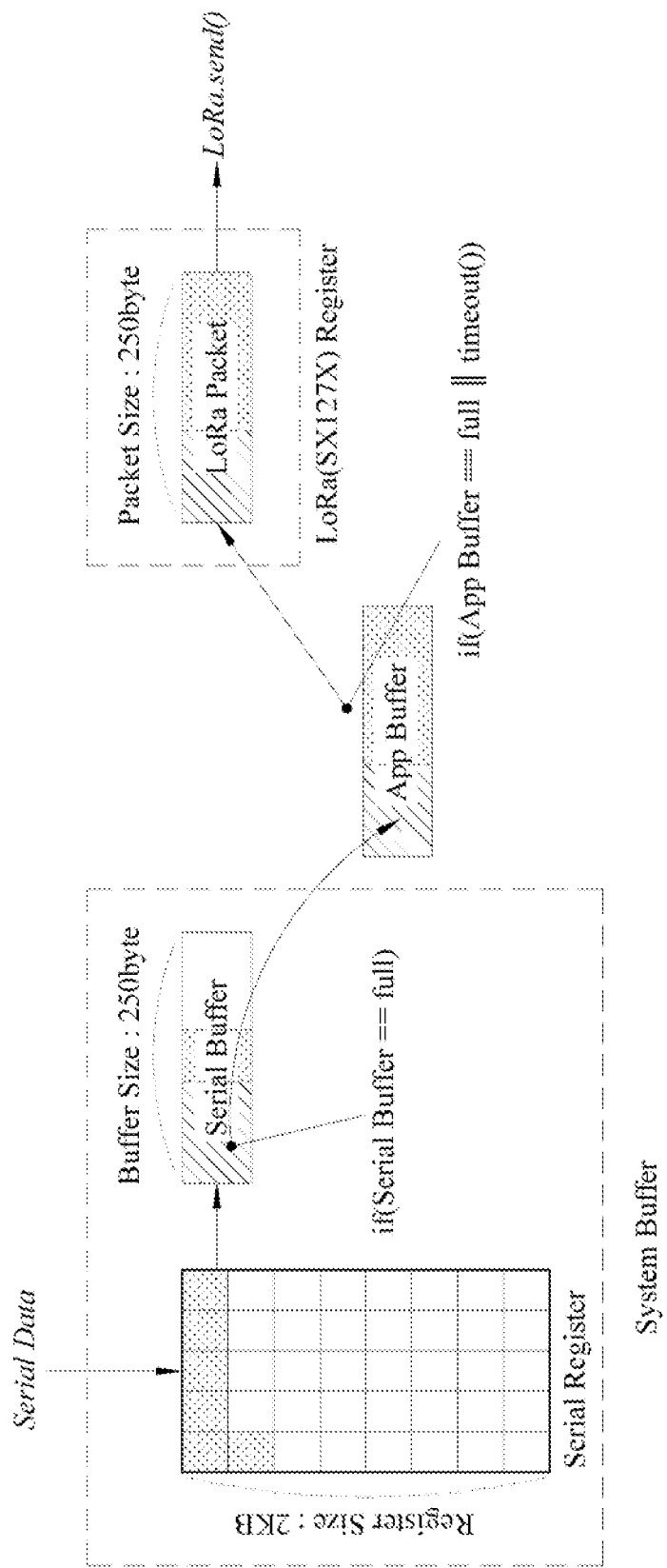
Figure 9:
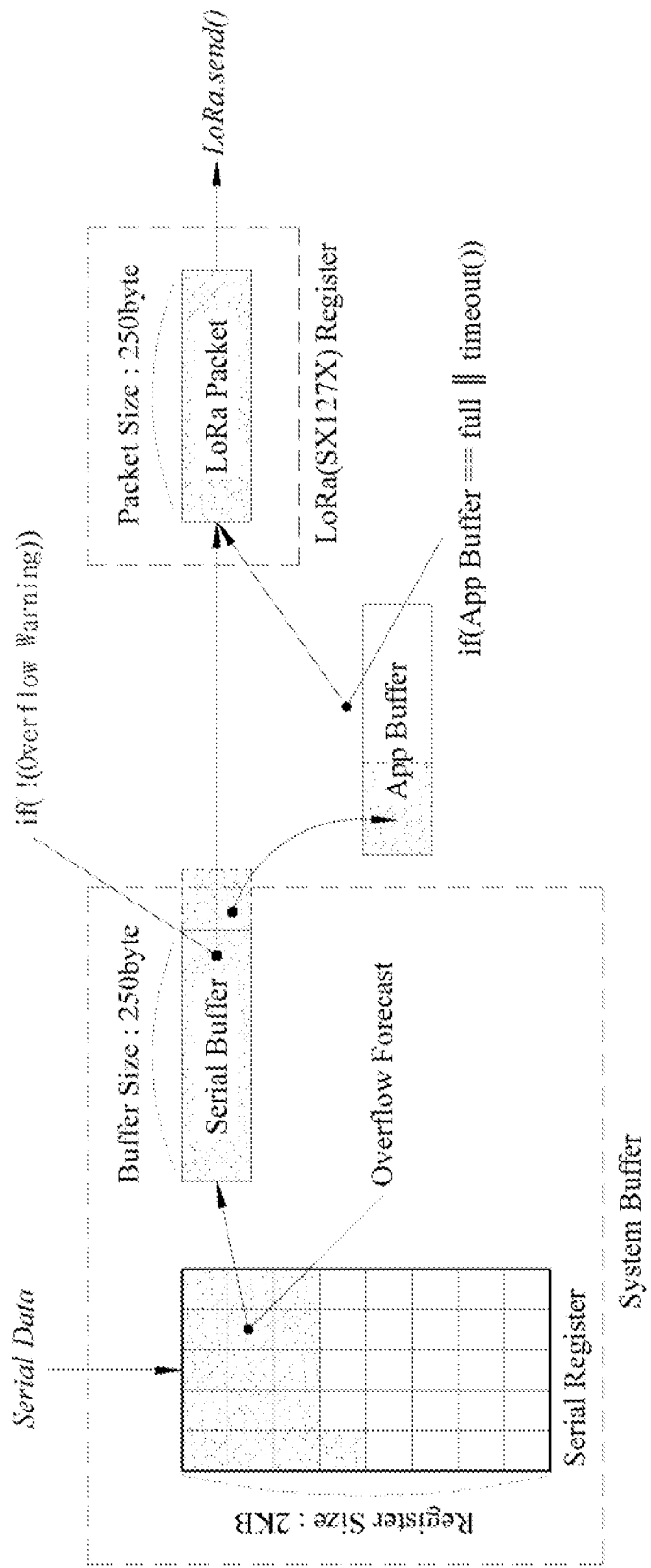
Figure 10:
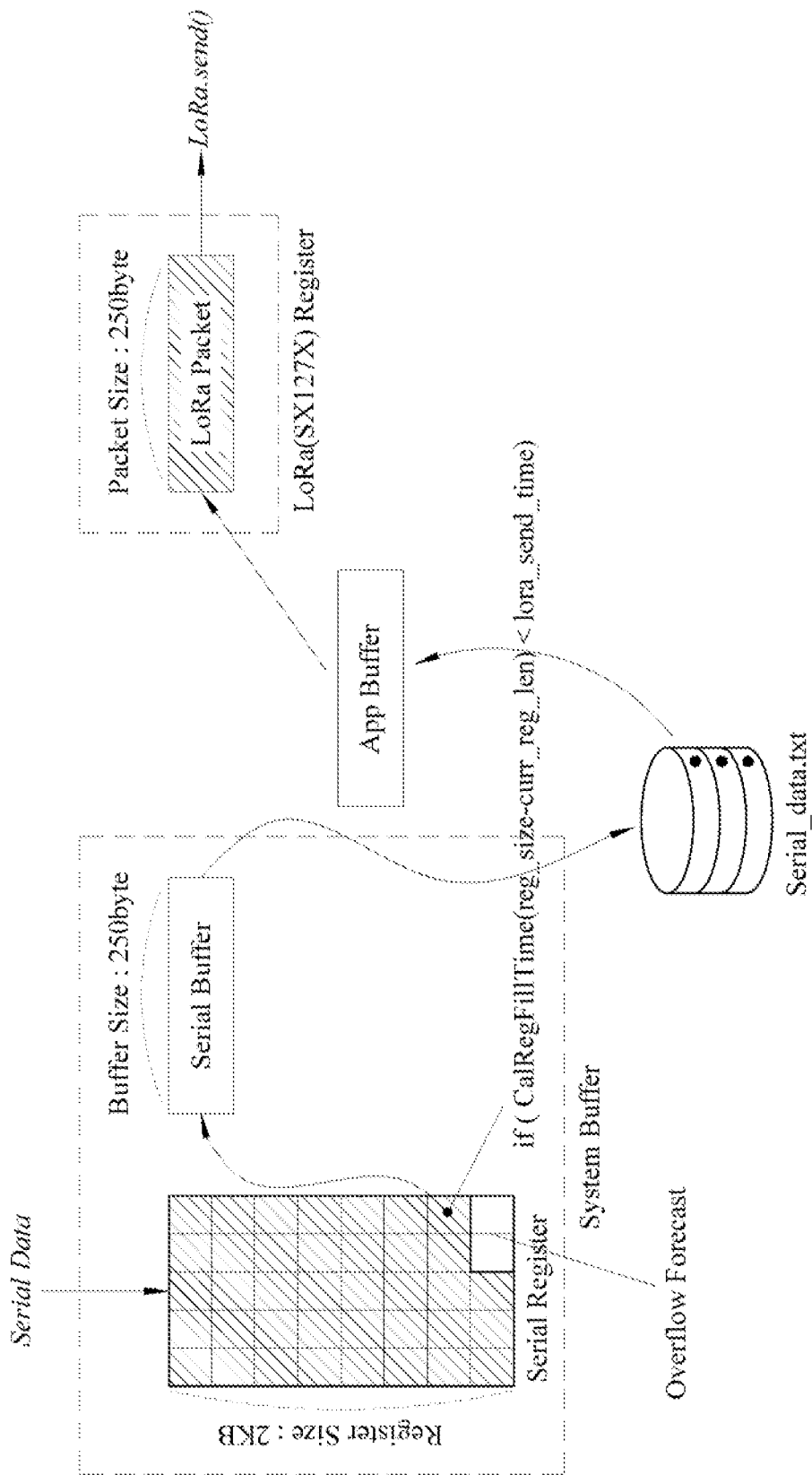

FIG. 6 illustrates the interactive remote device management method based on LoRa communication when a failure occurs in a network and a managed device.

The terminal node periodically checks whether the managed device is normal (S601).

When a failure occurs in the managed device, the terminal node sends a notification to the gateway through LoRa communication (S602).

The gateway sends a notification to the cloud system server to inform the user of the abnormality of the managed device (S603).

The user remotely transmits a power control command (S604) and physically controls (turns on/off) the power of the managed device (S605).

A local buffer control procedure according to the present invention will be described below.

FIGS. 7 to 10 are diagrams illustrating a local buffer control procedure according to the present invention.

The terminal node is provided with a local buffer controller to address the issue of memory shortage caused by a lightweight device through local buffer control for enhancing transmission efficiency in the terminal node and preventing a loss resulting from a transmission speed difference.

When the amount of information is small, local buffer control is performed using a combination of two system buffers and one coupling buffer. When the amount of information is large, local buffer control is performed using a combination of two system buffers, one coupling buffer, and a file.

Figure 11:
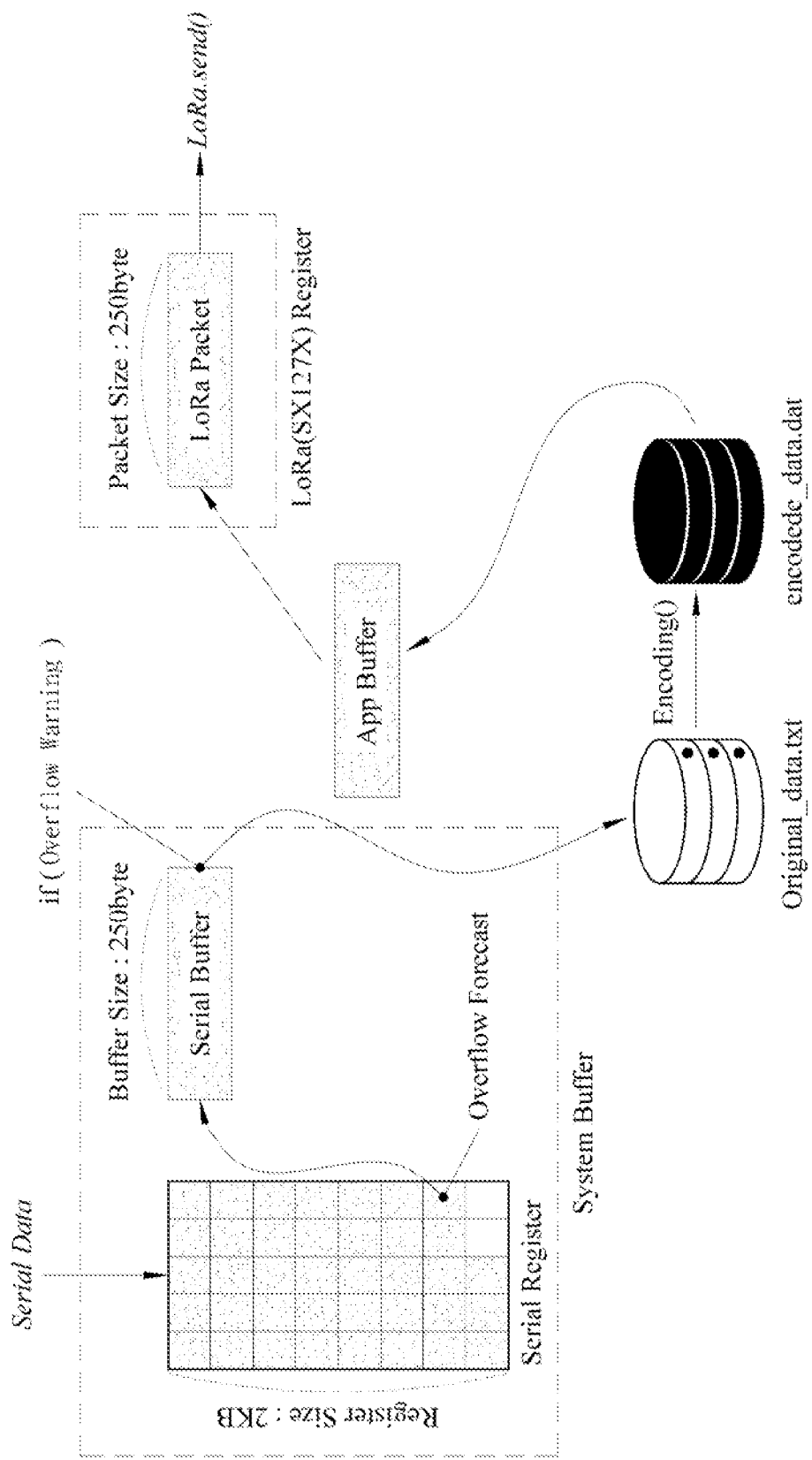
FIG. 11 is a diagram illustrating a data compression procedure according to the present invention.
Figure 12:
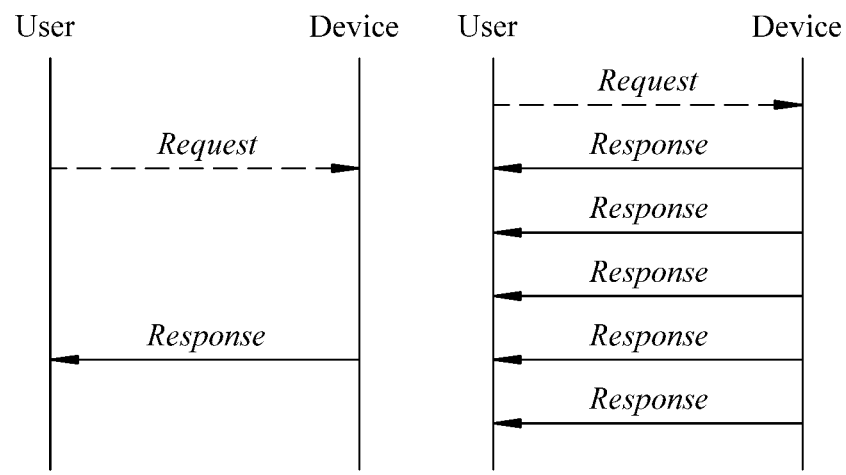
FIGS. 12 to 15 are diagrams illustrating an interactive process procedure according to the present invention.
Figure 13:
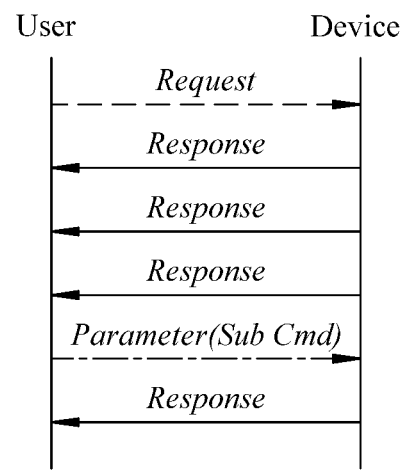
Figure 14:
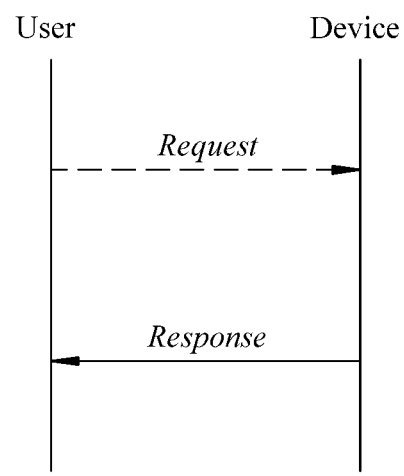
Figure 15:
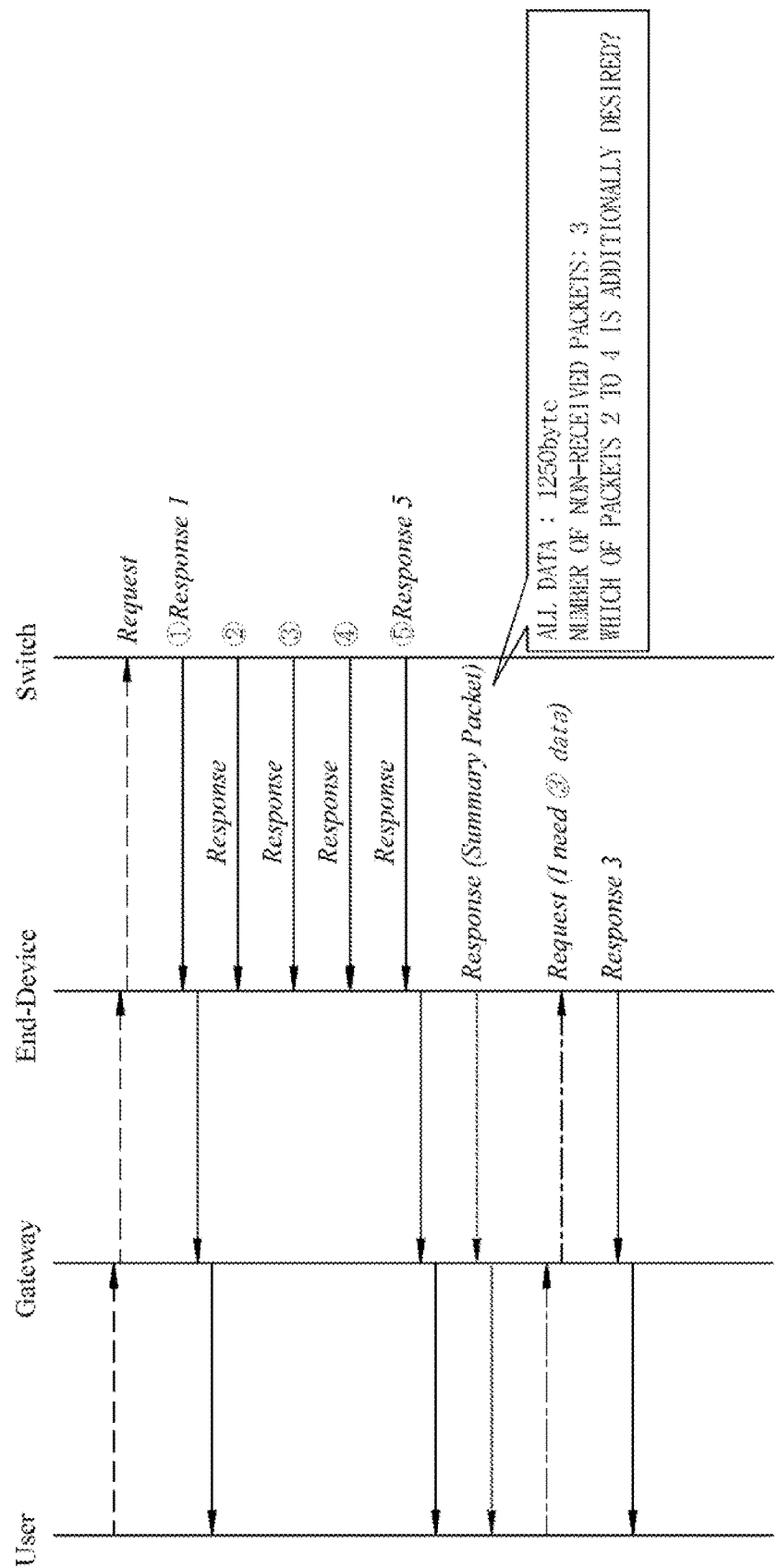

FIG. 11 illustrates a procedure of compressing transfer data to be transferred from a terminal node to a cloud system server.

FIGS. 12 to 15 illustrate an interactive process procedure according to the present invention. According to the interactive process procedure, a transmission time required for transmission of a large amount of data may be shortened by performing an interactive process. In addition, by receiving and checking only data required by a user by performing the interactive process, a raised issue may be efficiently coped with.

As described above, the system and method for interactive management of remote devices based on LoRa communication may remotely manage devices by constructing a management network independent of an existing network and effectively cope with a failure occurring in managed devices by configuring a terminal node attachable to the managed devices.

In particular, the issue of memory shortage caused by a lightweight device may be addressed through local buffer control for enhancing transmission efficiency in the terminal node and preventing a loss resulting from a transmission speed difference. In addition, a transmission time required for transmission of a large amount of data may be shortened by compressing transfer data to be transferred from the terminal node to the cloud system server and performing an interactive process.

As described above, a system and method for interactive management of remote devices based on LoRa communication according to the present invention have the following effects.

First, devices may be remotely managed by constructing a low-power long-range communication system for management of remote devices by addressing the issue of a transmission speed difference between a remote device management interface and LoRa communication.

Second, devices may be remotely managed by constructing a management network independent of an existing network, and a failure occurring in managed devices may be effectively coped with by configuring a terminal node attachable to the managed devices.

Third, the issue of memory shortage caused by a lightweight device may be addressed through local buffer control for enhancing transmission efficiency in a remote device management terminal and preventing a loss resulting from a transmission speed difference.

Fourth, a transmission time required for transmission of a large amount of data may be shortened by compressing transmission data to be transmitted from a remote device management terminal to a server and performing an interactive process.

Fifth, by receiving and checking only data required by a user by performing an interactive process, a raised issue may be efficiently coped with.

As described above, it will be understood that the present invention is implemented in a modified form without departing from the spirit and scope of the present invention.

Accordingly, the above-described exemplary embodiments are to be regarded in an illustrative rather than a restrictive sense. The scope of the present invention is indicated by the appended claims rather than by the foregoing description. Thus, it should be interpreted that all differences falling within the scope of the claims are embraced by the present invention.

What is claimed is:

1. A system for interactive management of remote devices based on Long-Range Sub-Ghz Module (LoRa) communication, the system comprising:
   a web application configured to provide a remote control page to a user;
   a cloud system server configured to transmit a management command and a transmission option to a gateway when the management command and the transmission option are input thereto through the web application and to receive a summary packet for received data;
   the gateway configured to receive, from the cloud system server, request data input by the user, transmit the request data to a terminal node through LoRa communication, decode response data received from the terminal node, and transmit the decoded response data to the cloud system server; and
   the terminal node configured to receive the management command and the transmission option from the gateway through the LoRa communication, transmit the management command and the transmission option to a managed device, and store corresponding response data from the managed device through local buffer control.

2. The system of claim 1, wherein the response data stored in the terminal node is classified, compressed, and transmitted according to the transmission option.

3. The system of claim 1, wherein the terminal node is operated based on a battery, is attached to the managed device to perform real-time interactive control, has an on/off switch function for the managed device, and constructs a management network independent of a service network.

4. The system of claim 1, wherein the terminal node comprises a local buffer controller configured to perform local buffer control for controlling a combination of a system buffer, a coupling buffer, and a file according to an amount of information to be transmitted to prevent a loss resulting from a transmission speed difference.

5. The system of claim 1, wherein the transmission option is one of entire packet transmission, specific packet transmission, packet range designation transmission, and summary packet transmission.

6. A method of interactive management of remote devices based on Long-Range Sub-Ghz Module (LoRa) communication, the method comprising:
   performing a user operation of inputting a management command and a transmission option through a web application;
   performing a cloud system server operation of transmitting the management command and the transmission option to a gateway when the management command and the transmission option are input and receiving a summary packet for received data;

performing a gateway operation of receiving, from the cloud system server, request data input by the user, transmitting the request data to a terminal node through LoRa communication, decoding response data received from the terminal node, and transmitting the decoded response data to the cloud system server; and performing a terminal node operation of receiving the management command and the transmission option from the gateway through the LoRa communication, transmitting the management command and the transmission option to a managed device, and storing corresponding response data from the managed device through local buffer control.

7. The method of claim 6, wherein the performing of the user operation comprises:

transmitting the management command and the transmission option to the gateway when the user inputs the management command and the transmission option through the cloud system server;

transmitting the received command from the gateway to the terminal node through the LoRa communication, receiving the response data for the command and transmitting the received response data to the cloud system server; and when the transmission option is an option to receive the summary packet, requesting, by the user, desired data by inputting a parameter to receive the summary packet for the received data.

8. The method of claim 6, wherein the performing of the gateway operation comprises:

receiving, by the gateway, the management command and the transmission option input by the user through the cloud system server;

transmitting the received management command and the received transmission option from the gateway to the terminal node through the LoRa communication;

receiving the response data from the terminal node and decoding the received response data; and transmitting the decoded data to the cloud system server.

9. The method of claim 6, wherein the performing of the terminal node operation comprises:

receiving, by the terminal node, the management command and the transmission option from the gateway through the LoRa communication;

transmitting the received data to the managed device through serial communication and storing corresponding response data through local buffer control; and compressing and transmitting the stored response data by classifying the stored response data according to the transmission option.

10. The method of claim 9, wherein the compressing and transmitting comprises:

when the transmission option is entire packet transmission (1), compressing an entirety of the response data and transmitting the response data to the gateway;

when the transmission option is specific packet transmission (2), compressing specific packet data requested by the user and transmitting the response data to the gateway;

when the transmission option is packet range designation transmission (3), compressing specific packet range data requested by the user and transmitting the response data to the gateway; and when the transmission option is summary packet transmission (4), compressing first packet data, last packet data, and summary packet data, transmitting the compressed first packet data, last packet data, and summary packet data to the gateway, receiving additional request data from the gateway, and transmitting response data for the additional request data to the gateway.

11. The method of claim 6, wherein the terminal node periodically checks whether the managed device is normal, wherein, when the terminal node issues a notification upon occurrence of a failure in the managed device, the user remotely transmits a power control command so as to physically control (turn on/off) power of the managed device.

* * * * *